Dec. 25, 1934.  F. I. ROWLEY  1,985,744
AUTOMATIC BRAKE GOVERNOR
Filed May 8, 1930  3 Sheets-Sheet 1

Inventor
Frederick I. Rowley
By Horace Pickery
Attorney

Dec. 25, 1934.  F. I. ROWLEY  1,985,744
AUTOMATIC BRAKE GOVERNOR
Filed May 8, 1930   3 Sheets-Sheet 2

Inventor
Frederick I. Rowley
By
Attorney

Dec. 25, 1934.  F. I. ROWLEY  1,985,744
AUTOMATIC BRAKE GOVERNOR
Filed May 8, 1930  3 Sheets-Sheet 3
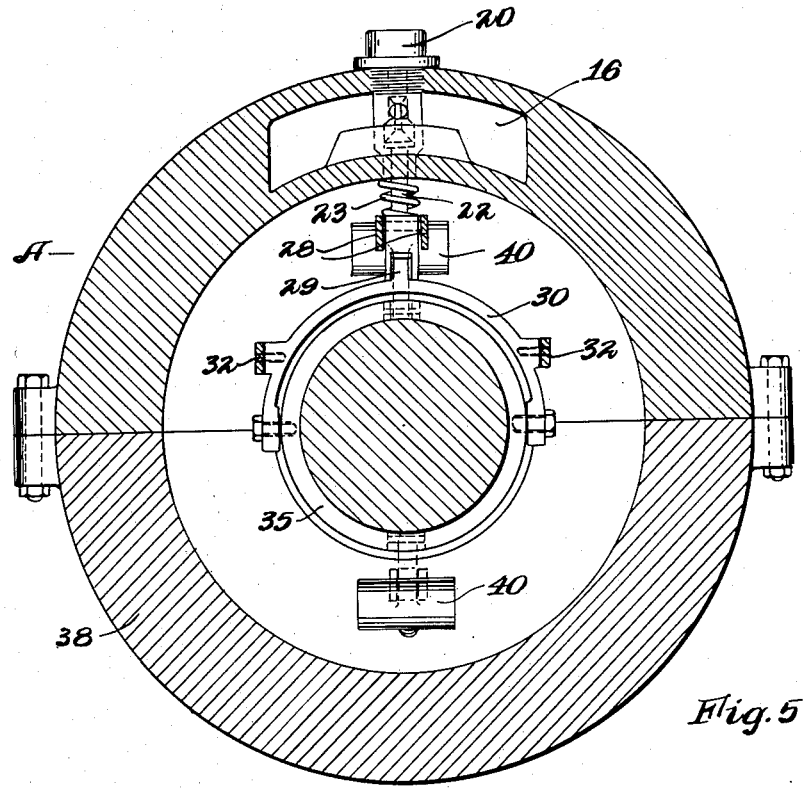
Fig. 5
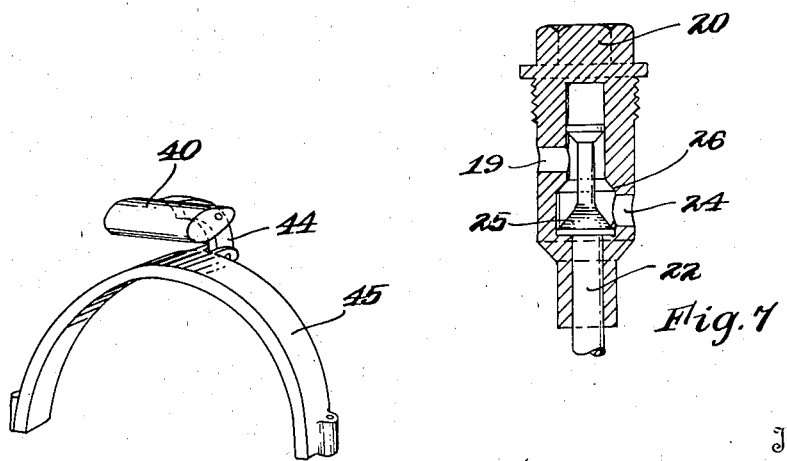
Fig. 6
Fig. 7
Inventor
Frederick I. Rowley
By
Attorney Patented Dec. 25, 1934

1,985,744

UNITED STATES PATENT OFFICE 1,985,744

AUTOMATIC BRAKE GOVERNOR

Frederick I. Rowley, St. Paul, Minn.

Application May 8, 1930, Serial No. 450,704

10 Claims. (Cl. 188—181)

My invention relates to an improvement in automatic brake governors, of a type particularly adapted to be secured to one of the axles of a railway car or the like, for the purpose of governing the brakes upon all of the wheels of the car.

It is the object of my invention to prevent the skidding of the car wheels, particularly upon the trucks of railway cars, when the brakes are being applied to the same. By keeping all of the wheels turning, and preventing the locking of the same, it is possible to avoid all trouble caused by flat or burnt spots on the wheels, eliminating a great expense item in the upkeep of the cars, and doing away with much discomfort to the passengers within the car.

It is a feature of my invention that the wheels of the car are kept turning at all times by the operation of my governor, except when the engineer or operator of the train desires to make an emergency stop. At this time, the governor may be so connected as to be rendered inoperative by merely applying a higher pressure of air than is otherwise employed. In this manner, the governor will not operate to prevent the necessarily quick stopping of the train in an emergency.

It is my object to apply the governor to the railway car, and to provide the pair of wheels on the axle to which the governor is secured with more braking power than any other pair of wheels on the car. In this manner, the pair of wheels associated with the governor will be the most sensitive, and will start to skid before any other of the pairs of wheels. Thus, when the brakes are applied to the car wheels, especially in wet or frosty weather, and the pressure of the brakes is sufficient to cause the wheels to skid, the wheels associated with the governor will lock before any of the other wheels of the car. One pair of wheels may easily be provided with this greater breaking power by adjustment of the brake levers.

It is the object of my invention to connect my brake governor with the air brake cylinder in such a manner that when the pair of wheels associated with the brake cylinder start to lock or skid, the governor acts to release just enough brake cylinder air, and thus relieve the pressure of the brakes just sufficiently to allow these governor wheels to start revolving again before they skid a sufficient time to burn or wear a flat spot on the same. Just as soon as the governor wheels start to revolve, the governor acts to stop the releasing of brake cylinder air. It may be seen that the result produced is that as much braking power as possible will be applied to the wheels at times when the train or car is to be stopped, and at the same time the wheels will be kept revolving and will not be allowed to skid.

The governor is so devised as to be equally effective regardless of the direction of travel of the car and will operate in the same manner whether the car is being pushed or pulled. Thus, my governor is flexible in its application, and no special care need be given it beyond the periodic inspections ordinarily made of all moving parts of the car.

It is a feature of my invention that the brakes may be tested or applied at a depot or on a hill whether the train is in motion or standing still. Accordingly, while ordinarily the skidding of the wheels, or stopping of the same, will act to release the pressure in the brake cylinder, my governor is so connected that the train may be kept from motion on a hill or at a station without the continual loss of brake cylinder air.

It is the object of my invention to provide a governor which will act to keep a maximum of braking power while the wheels are still in motion regardless of weather conditions. In warm dry weather, a brake pressure may be used which is more than sufficient to lock or skid the car wheels in wet or frosty weather. The weather conditions and the conditions of the rails in different localities through which a train or car may pass varies considerably, and even with the utmost care the wheels are often allowed to skid without the knowledge of the car operator. It is my purpose to eliminate this possibility, and avoid the damage caused thereby.

Other novel features, and objects of my invention will be more fully and clearly set forth in the following specification and claims.

In the drawings forming a part of this specification:

Figure 5 is a cross-sectional view through my governor on the lines 5—5 of Figure 3.

Figure 6 is a perspective view of a detail portion of my governor.

Figure 7 is a cross-sectional view of a detail portion of my governor.

Figure 1:
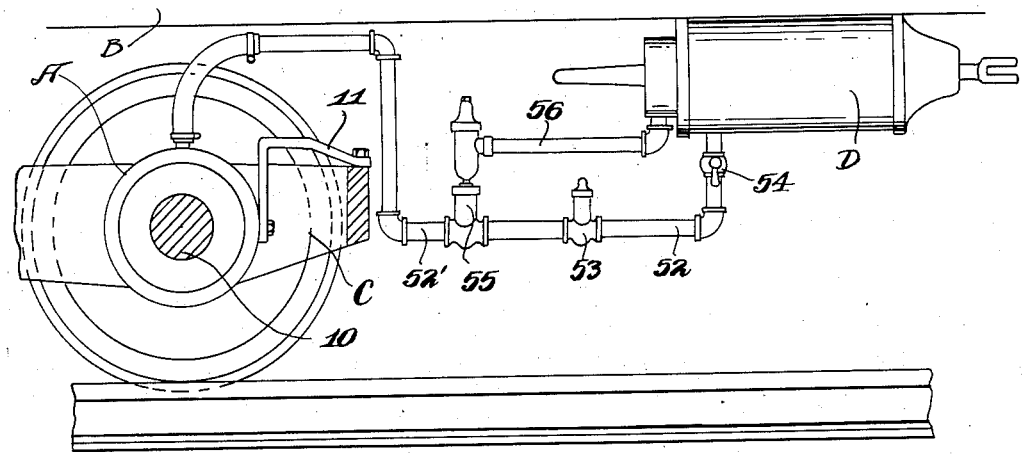
Figure 1 illustrates my governor diagrammatically, showing the method of connecting the same to a car wheel axle.
Figure 2:
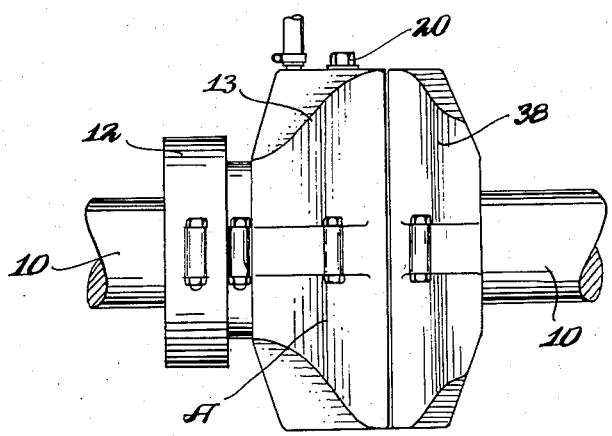
Figure 2 is an elevation view of my governor.

My governor A is adapted to be secured upon the axle 10 of the car B. A brace 11, extending from a suitable position upon the truck frame C to the casing of the governor A prevents the rotation of the governor with the axle 10, and the governor is withheld from moving laterally along the axle 10 by means of a collar 12 which is secured integrally to the axle 10 and which fits over a projecting collar upon the immovable portion 13 of the governor. An inwardly extending flange 14 upon the collar 12 hooks over the outwardly extending circumferential flange 15 upon the immovable portion or stationary housing 13. Motion of the housing 13 in one direction is prevented by the end of the housing abutting the collar 12, while motion in the opposite direction is prevented by the flange 15 abutting the flange 14. Suitable lubrication is provided for the contacting surfaces of the collar 12 and the housing 13.

At the top of the housing 13, I provide an air chamber 16 connected to the air hose 17 by means of a nipple 18. An air passageway 19 connects the chamber 16 to a balanced air valve 20. The plunger 22 within the air valve is normally held by spring tension of the coil spring 23 in open position, so that there is an unobstructed passage for air within the chamber 16, through the valve 20, out through the exhaust port 24 into the inner portion of the governor A from which it may be expelled through the natural openings between the various portions of the governor, or through holes, not illustrated, formed for this purpose. In the closed position of the valve 20, the plunger 22 is forced upwardly, a beveled valve portion 25 seating against the valve seat 26 to prevent the expulsion of air through the valve 20 from the chamber 16.

Figures 3, 4:
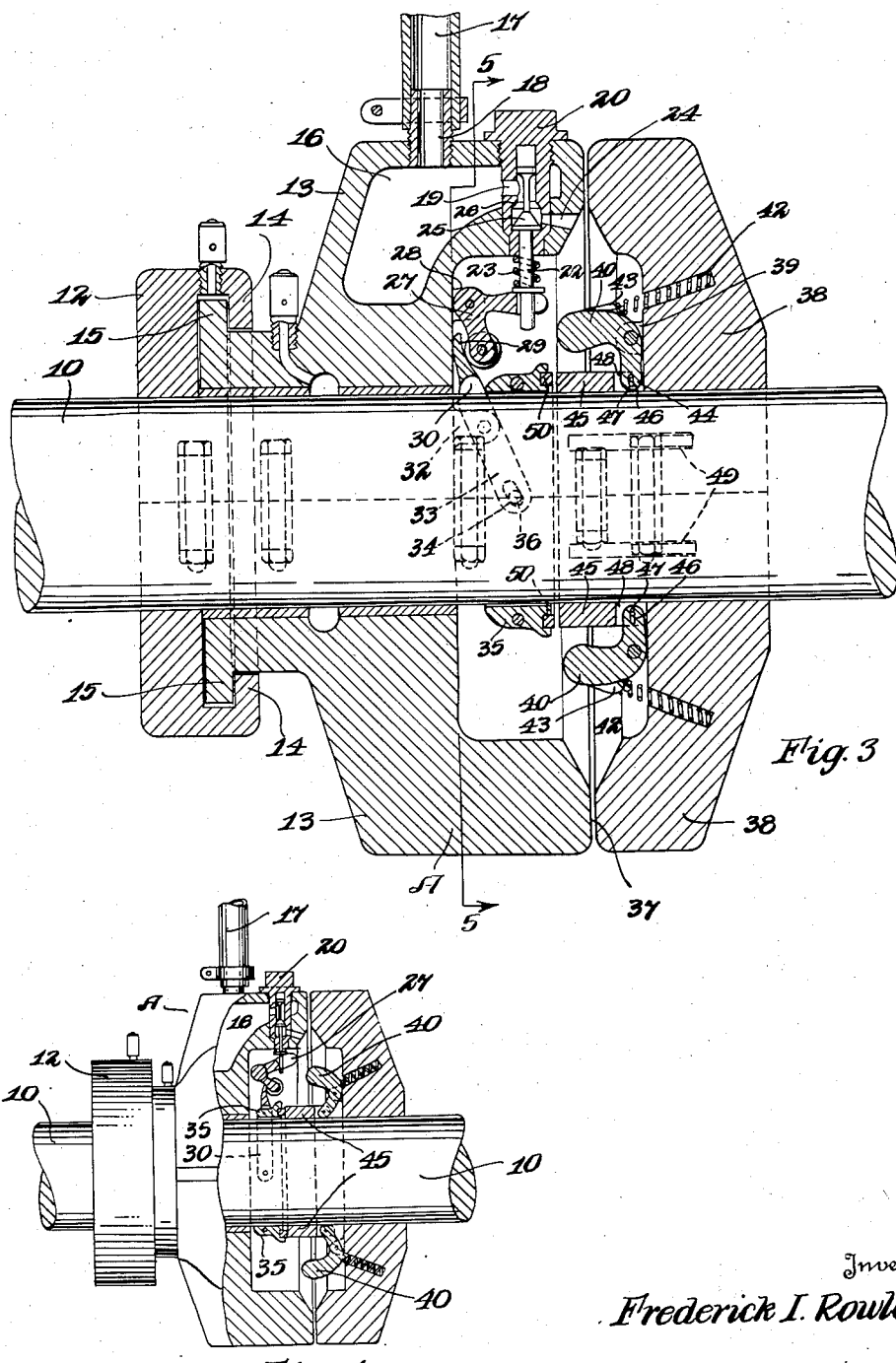
Figure 3 is a cross-sectional view through the center of my governor.
Figure 4 is an elevation view of my governor, a part of which is broken away to illustrate a different position of parts from that shown in Figure 3.

The plunger 22 is operated by means of a bell crank 27 which is pivoted to a pair of ears 28 mounted upon the housing 13. The bell crank 27 is moved by a lug 29 centrally positioned upon the yoke 30, which straddles the axle 10, and is pivoted to the ears 32 upon the housing 13. A roller upon the bell crank 27 against which the lug 29 acts, provides a virtually frictionless contact between these two parts, and as the coil spring 23 is of just sufficient strength to insure the correct position of the valve when the axle 10 is not revolving, the yoke 30 may be operated very easily to close the valve. The operation of the plunger as thus described may be easily seen and understood in Figure 3 of the drawings, while the shape of the yoke 30 may be seen in Figure 5.

The lower ends 33 of the yoke 30 which extend beyond the ears 32 to which the yoke is pivoted are provided with slots 34. A sleeve 35, slidable upon the axle 10, is provided with a pair of bolts 36, diametrically opposed and extending through the slots 34. The bolts 36 prevent the rotation of the sleeve 35 with the axle 10, but the pivoting of the yoke 30 upon the ears 32 permits the sleeve to move laterally, however against the tension of the coil spring 23.

Adjacent the edge 37 of the stationary housing 13, but spaced therefrom sufficiently to prevent friction, I provide a revolving housing 38 which is secured integrally to the axle 10 to revolve with it. Secured pivotally to ears 39 upon the housing 38, I provide a pair of fly weights 40, adapted to be thrown outwardly from the axle by centrifugal force when the axle 10 and housing 38 revolve, against spring tension of the compression springs 42. Projections 43 upon the fly weights 40 limit the motion of the weights, so that after a certain speed of revolution of the axle and housing 38 has been attained, greater speed will not affect the motion of the weights.

The fly weights are shaped similarly to a bell crank, the end of the crank on one end of the pivot point forming the weight, and the other end 44 forming a lever by which a sliding sleeve 45 is operated. Slots 46 in the ends 44 of the weights allow the insertion of pins or bolts 47 mounted upon lugs 48 on the sliding sleeve 45, and as the weights 40 are forced outwardly by centrifugal force, the sleeve 45 is moved away from the housing 38 and forced against the anti-friction facing 50 of the sleeve 35. Pins 49 extending from the housing 38 in a manner to project into holes in the sleeve 45 cause the sleeve 45 to revolve with the housing 38.

It may now be seen that, as the axle 10 revolves, carrying with it the housing 38, the weights 40 will be thrown outwardly by centrifugal force. As the weights move outwardly, the slidable sleeve 45 is forced away from the housing 38, and against the anti-friction facing 50 on the sleeve 35. The sleeve 35 is forced toward the housing 13 by the sleeve 45. The yoke 30, pivoting on the ears 32, is forced against the bell crank 27. The bell crank 27 in turn closes the valve 20, preventing any flow of air therethrough from the chamber 16. This position of the parts is clearly illustrated in Figure 4 of the drawings.

The air within the governor is taken from the brake cylinder D in such a manner that but little air is released at a time, so that the governor A will not interfere with the sustention of proper air pressure in the cylinder, and so that the loss of compressed air will be slight. The cylinder D is connected with the train brake pipe not illustrated in the drawings, and operates in the manner well known in the art. The pipe 52 connects the air outlet from the brake cylinder with a reducing valve 53, which is set at a certain pressure. It is obvious that if a lower pressure existed within the brake cylinder D, no air would pass through the reducing valve 53 and into the governor through the pipe 52'. However, a pressure lower than is necessary to pass through the reduction valve 53 will be sufficient to hold the train or car stationary upon a hill or at a station. This lower pressure is also sufficient to test the brake line. Therefore, when the train is stationary, no air need pass through the reducing valve 53 into the governor A, so that at such times, as the fluid pressure in the brake cylinder is equal to or less than the reducing valve setting, the governor is inoperative to further reduce the brake cylinder pressure.

However, if sufficient pressure is in the brake cylinder to cause the wheels to lock, this pressure will also be sufficient to pass through the reduction valve 53 into the governor. The air, however, cannot escape from chamber 16 of the governor as long as the axle 10 is revolving, as the valve 20 is held in closed position by the force of the weights 40. As soon as the wheels skid, and the axle stops revolving, the weights 40 are forced inwardly by the compression springs 42, the valve 20 opens, and air is allowed to escape through the exhaust port 24 of the valve 20 until the pressure within the brake cylinder is sufficiently reduced to allow the wheels to start revolving again, when the weights 40 again act to close the valve 20. A shut off valve 54 permits the governor to be entirely shut off at any time if it is desirable, this valve 54 being positioned in the pipe line 52 between the brake cylinder D and the reducing valve 53.

If, in the case of emergency, it is desired to bring the train to a stop more quickly than could otherwise be possible, it is advantageous to render the governor inoperative, so that the brakes may be applied forcefully to all of the wheels. This is accomplished by means of a valve 55 in the pipe line 52' which is operated by high emergency pressure. When there is extremely high pressure in the brake cylinder D, this pressure is transmitted through the pipe 56 which is associated with the cylinder D, to the emergency pressure valve 55. This pressure acts to close the valve in the pipe line 52', so that no air is allowed to enter the governor A. During the emergency the valve 55 operates before any appreciable quantity of air could escape if the governor should operate to vent the cylinder. Thus, when the emergency air tank is used, the governor will be held inoperative. Accordingly, when an emergency pressure sufficiently high to operate the valve 55 is injected into the cylinder, no air will be vented. As the valve 55 is interposed in the pipe line between the valve 53 and the governor, the pressure passing through the reducing valve 53 will not be vented.

The valve 55 is any suitable type of pressure operated shut-off valve. In Figure 1, the valve 55 is interposed between the pipes 52 and 52'. A cut-off valve is positioned in the lower portion of the valve casing, normally held open to provide free passage of air between the pipes 52 and 52' by means of a coil spring, not shown in the drawings. A valve plunger, also not shown, is connected to the cut-off valve, and is subjected to the pressure in the pipe 56, which is equal to the pressure in the pipe 52. When the pressure in the pipe 56 reaches a predetermined value, such as 70 pounds for example, this pressure acts against the plunger of the valve within the valve 55, and cuts off the passage between the pipes 52 and 52'. As this type of valve is known in the art, it has not been specifically illustrated.

In order to more clearly illustrate the method of connecting my governor so that it will be operative when necessary, and held from operation when not desired, say, for example, that the reducing valve 53 is set at fifty pounds pressure. In other words, it requires a pressure of at least fifty pounds in the pipe 52 to permit air to be conveyed through the pipe 52' to the governor A. It is apparent that any pressure up to fifty pounds may be used in the brake cylinder without affecting the governor. This is ordinarily much more than enough to hold a car stationary at a station or on a hill, and in slowing up the car slightly, it would not require enough pressure in the brake cylinder to pass through the valve 53. If more than fifty pounds were used in the brake cylinder, air would pass into the governor A, and, if the wheels started to skid, the governor would act to release the pressure in the cylinder, until the wheels again began to revolve.

When a great enough pressure is inserted in the brake cylinder to lock all the brakes for stopping the train in an emergency, seventy pounds for example, the pressure valve 55 operates to close the pipe line 52' with which it is associated. Therefore, the two pressures between which the governor would be operable, will be fifty and seventy pounds, between which pressures the skidding of the wheels associated with the governor will occur. As the governor is situated on the light weight end of the car B, and as the wheels with which the governor is associated have more braking power than the other wheels, the governor will act between these pressures to prevent the wheels from skidding a long enough time to form flat spots. I have described my governor as being applicable for use on a certain axle of the car, however, in a similar manner the governor may be used on any axle of the car upon a counter-shaft, or may be supported in any manner to be motivated by the rolling of the car.

In accordance with the patent statutes, I have described the principles of operation of my governor, and while I have endeavored to set forth the best embodiment thereof, I desire to have it understood that this is only suggestive of a means of carrying out my invention, and that obvious changes may be made within the scope of the following claims without departing from the spirit of the invention.

I claim:

1. An automatic air brake governor for train wheels including, governor means at all times rotatable with the rotation of the train wheel, means for automatically releasing excessive air pressure from the air brake cylinder when the pressure is sufficient to cause locking and skidding of the wheels, and spring means urging said releasing means into open position, said governor decreasing tension of said spring means as the speed decreases.

2. An automatic air brake governor for railway wheels comprising, governor means adapted to be continuously rotated with the wheels, air releasing means in said governor connected with the air brake cylinder to automatically release excessive air brake pressure, and automatic means for causing said releasing means to be ineffective under extreme high air braking pressure, whereby said governor is ineffective in emergency braking.

3. An automatic railroad brake governor including, a governor element, means for operating said element at all times with the rotation of the wheels, means spring actuated in one direction and governor actuated in the other direction for relieving air pressure from the air brake cylinder when the wheels start to skid to relieve just enough pressure to prevent the wheels from skidding on the tracks in braking, a decrease in speed decreasing the tension of said spring.

4. An air brake governor adapted to overcome the skidding of railway wheels while applying the brakes including, a governor, means connecting said governor with the air brake cylinder, an air relief valve in communication with said connecting means, means for operating said governor to maintain said relief valve ineffective while the wheels are rotating during the applying of air into the air brake cylinder and to permit said relief valve to automatically operate when the wheels start skidding while applying the brakes, and means for rendering said relief valve ineffective for emergency braking.

5. An air brake governor for railway wheels including, a governor mechanism mounted upon the wheel axle to turn continuously while said axle is turning, a casing for inclosing said governor, one portion of said casing remaining stationary and the other portion being adapted to rotate with the axle, an air release valve in said casing, lever and collar means for operating said valve carried by said stationary part of said governor casing, governor members carried by said rotatable member, a second collar operable by said governor members adapted to engage said first collar to normally maintain said release valve closed during the rotation of the axle, said release valve being connected with the air brake cylinder to regulate the air brake pressure therein.

6. A governor for air brake cylinders for railway trains including, a governor element, means for operating said governor, an air relief valve in said governor, means for connecting said relief valve with the air brake cylinder of a car of the train, and means associated with the air brake cylinder adapted to limit the operation of the governor and relief valve to a predetermined range of pressures and to cause said governor relief valve to be ineffective when a higher air pressure is introduced into said air brake cylinder.

7. An air brake governor of a railroad car in combination with the air brake cylinder said governor operable by the rotation of the car wheels, a relief valve in said governor, means for connecting said relief valve with the air brake cylinder, said governor causing said relief valve to operate to relieve the air brake pressure in the air brake cylinder when the pressure is inclined to skid the wheels on the rails, and auxiliary connecting and valve means between said cylinder and said governor to shut off the connection with said governor relief valve in emergency braking.

8. An air brake governor for railway cars including, an air relief valve, means for connecting said relief valve with the air brake cylinder, governor means for forcing said valve into closed position, spring means urging said valve into open position, the tension on the spring means decreasing with a decrease in speed, means for continuously operating said governor in accordance with the rotation of the wheels to regulate said relief valve to cause the same to relieve air pressure over a pre-determined amount, whereby said air brake cylinder is operated to prevent skidding of the wheels.

9. An air brake governor for the air braking system of railroad cars in combination with the air brake cylinder, an air relief valve, a governor for operating said relief valve, means for operating said governor, means for connecting said relief valve with the air brake cylinder, a reduction valve in said connecting means for said relief valve to limit the effectiveness of said relief valve to a pre-determined pressure range, and an emergency shut-off valve interposed in said connecting means and operable by the brake cylinder pressure to shut off the effectiveness of said relief valve in emergency braking.

10. A governor for automatically regulating the brake cylinder pressure applied to the brakes of railroad wheels in combination with the cylinder, a governor, a relief valve adapted to be operated by said governor, means for operating said governor to cause the same to operate said relief valve to relieve pressure in the air brake cylinder when air braking pressure to a degree of skidding the wheels is applied in the cylinder, means for connecting said relief valve to the cylinder, an air regulating valve in said connecting means adapted to operate at certain pre-determined pressures, and a shut-off valve in said connecting means operable to automatically shut off the connection to said relief valve from said air brake line and cylinder when a pressure above normal is applied.

FREDERICK I. ROWLEY.